Patented Oct. 8, 1935

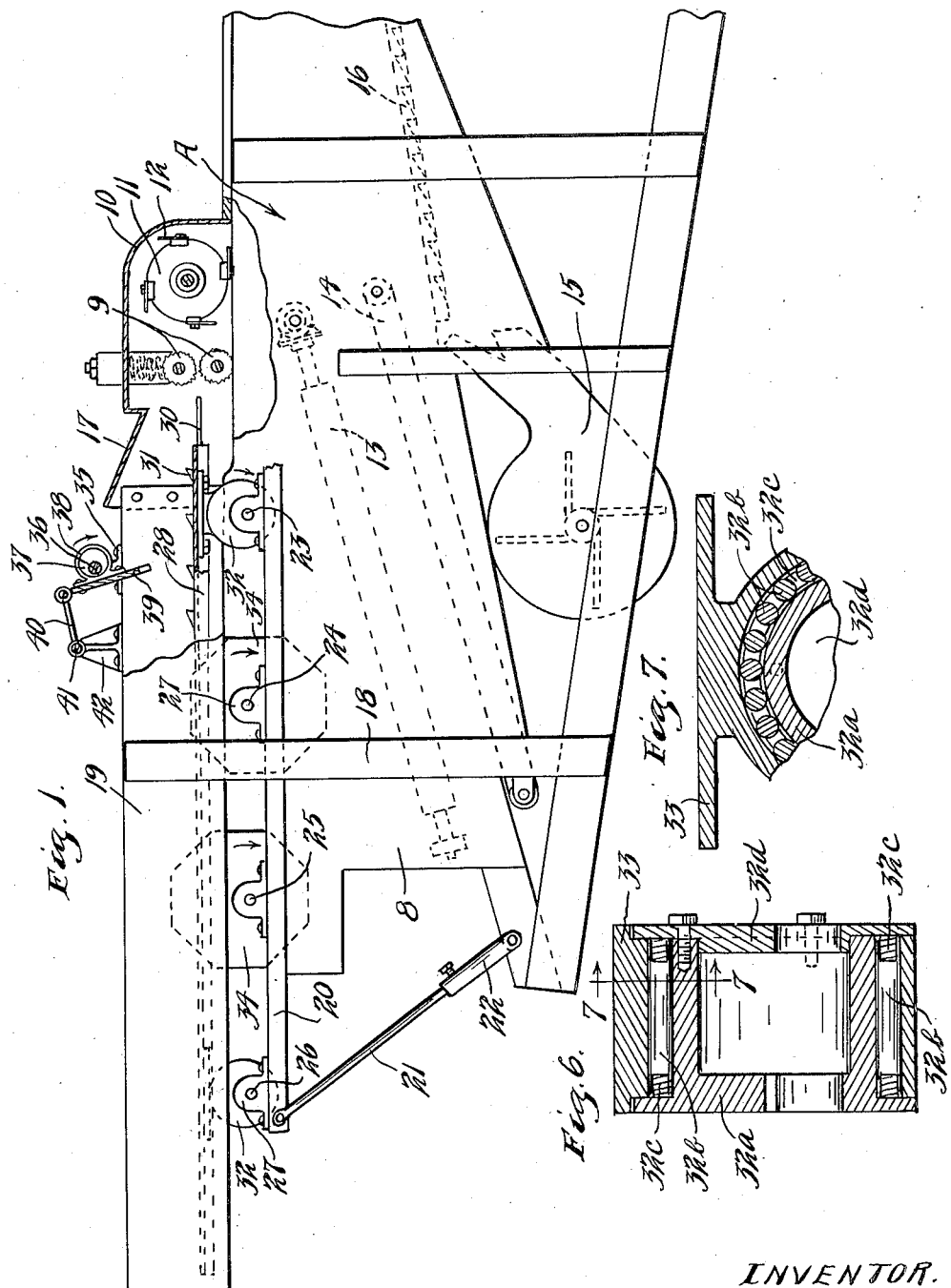

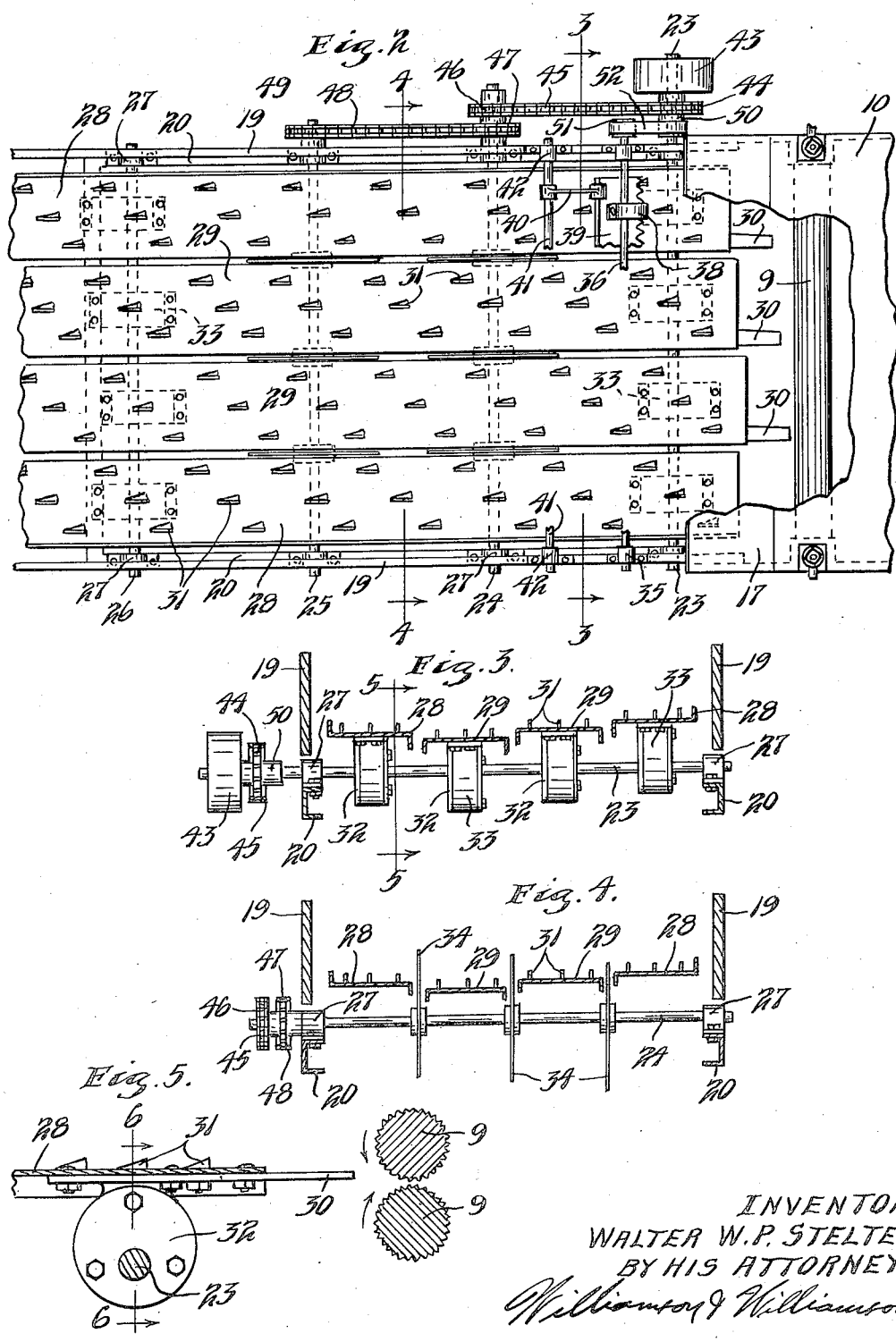

2,016,910

UNITED STATES PATENT OFFICE 2,016,910

FEEDER FOR CORN SHREDDERS AND THE LIKE

Walter W. P. Stelter, Echo, Minn.

Application August 4, 1932, Serial No. 627,397

17 Claims. (Cl. 130—33)

This invention relates to feeders for corn shredders and other kindred machines.

In most corn shredders used today, the corn is fed to the snapping rollers by means of endless belts or slat and chain conveyers. These belts or conveyers at their forward ends terminate short of the snapping rollers in order to permit the ears of corn released from the stalks to drop downwardly onto husking rollers or to be collected. In such machines it often occurs that through the feed of too great quantities of the stalks to the rollers at one time or through the fact that some of the stalks will work crosswise of the belts, the corn stalks will choke up between the forward end of the belt or conveyer and the rollers. It then becomes necessary for the operator of the machine to remove the choked corn stalks by hand at considerable risk of injury to a hand or arm by being caught in the corn stalks and carried to the snapping rollers if the machine is running.

At the present time as the bundles of corn are about to be fed to a corn shredder, the twine binding the bundles is manually cut, whereupon the bundles are pitched onto the belt or conveyer running to the snapping rollers. The cutting of this twine involves considerable labor and time. Also considerable difficulty is involved with the ordinary feeder for corn shredders in spreading the corn stalks evenly transversely of the belt or conveyer to cause the stalks to be fed evenly to the snapping rollers throughout their length.

It is an object of the present invention to provide a novel and improved feeder for use with such machines as corn shredders, which will obviate the possibility of choking the machine, to eliminate the danger of loss or injury of limb in remedying the choked condition, and at the same time will make it unnecessary to shut down the machine to permit choked corn stalks being safely removed.

Another object is to provide a feeder including novel cutting means for cutting the twine on bundles which may be fed to the machine, thereby eliminating the necessity for manually cutting the twine about such bundles before the bundles are fed to the machine.

Yet another object is to provide in such a feeder means for spreading the stalks laterally during travel of a bundle of stalks to the snapping rollers to cause even feed of stalks to the rollers throughout the entire length of the rollers.

Yet another object is to spread the stalks in a bundle lengthwise of the feeder to more evenly feed the same to the snapping rollers.

One other object is to provide mechanism which acts against the upper portions of the stalks to retard advancing movement of the upper strata of corn as the corn under the action of the feeder runs to the snapping rollers.

Another object is to provide twine cutters of novel and efficient design which at the same time that they cut the twine of the bundles, assist in advancing the stalks toward the snapping rollers.

Another and one of the primary objects of the invention is to provide means for simultaneously gyrating and advancing feed such as corn stalks to a pair of rollers such as snapping rollers, to permit the feed to be readily received between the rollers without bunching or accumulating behind the rollers.

These and other objects and advantages of the present invention will more fully appear from the following description, made in connection with the accompanying drawings, wherein like reference characters refer to the same or similar parts throughout the various views and, in which, Fig. 1 is a view in side elevation illustrating a corn shredder to which a feeder embodying the present invention has been applied, portions of the shredder and feeder being broken away and other portions being shown in vertical section;

Fig. 2 is a plan view of the machine illustrated in Fig. 1, certain parts being broken away to more clearly show the construction of other parts;

Fig. 3 is a vertical section taken on the line 3—3 of Fig. 2;

Fig. 4 is a vertical section taken on the line 4—4 of Fig. 2;

Fig. 5 is a vertical section taken on the line 5—5 of Fig. 3;

Fig. 6 is a vertical section taken on the line 6—6 of Fig. 5; and

Fig. 7 is a vertical section taken on the line 7—7 of Fig. 6.

Portions of a combined husker and shredder A are illustrated which include a body 8, and a pair of snapping rollers 9 mounted in a casing 10 at the upper portion of the body 8 forwardly from its rear end, the upper of said snapping rollers 45 being spring pressed into engagement with the lower of said rollers. There is also shown a rotary cutting head 11 carrying the cutter knives 12 and disposed within casing 10 forward of the snapping rollers 9. Below the snapping rollers 50 9 there are located husking rollers 13 and below the husking rollers there is disposed a conveyor 14. A blower fan 15 is disposed below the conveyor 14 to blow a blast of air upwardly through a sieve 16. Inasmuch as the present invention 55 relates to a feeder for the shredder, it is thought unnecessary to go into a further description of the shredder at this time. Attention should, however, be called to the fact that the casing 10 rearward of the snapping rollers 9 is provided with an upper mouthplate 17 which inclines downwardly and forwardly toward the snapping rollers.

A pair of upright bars 18 are secured to opposite sides of the body 8 and secured to these upright bars and to the rear end of the casing 10 are a pair of side boards 19. A pair of side rails 20 are suitably secured at their forward ends to the body 8 and they are supported at their ends by longitudinally adjustable rods 21 fitting within sockets 22 pivotally connected to the lower rear end of the body 8. Four cross shafts 23, 24, 25 and 26 respectively, are suitably journaled within bearings 27 carried by the side rails 20. A plurality of decks 28 and 29 illustrated in the drawings as being four in number, are disposed above the various shafts and these decks extend generally longitudinally of the machine between the side boards 19 in closely spaced relation. The outer decks 28 are similar to the inner decks 29 with the exception that upwardly projecting flanges are formed on the outer edges of the two outer decks, while downwardly projecting flanges are provided at the inner edges of the outer decks and at the inner and outer edges of the inner decks. The decks 28 and 29 terminate at their forward ends in rearwardly spaced relation from the snapping rollers 9 and certain of the decks have secured to their forward ends at transversely spaced points, what I choose to call forwardly projecting bridging arms 30 which almost bridge the space between the forward ends of the decks and the snapping rollers. Secured to each of the decks 28 and 29 at longitudinally spaced and transversely spaced points are a multiplicity of upwardly projecting teeth 31 which are triangular in shape and run diagonally upwardly and forwardly from the upper surfaces of the decks. These teeth 31 may also be provided with triangular horizontal flanges to permit ready attachment of the teeth to the decks.

Secured to the bottoms of the various decks 28 and 29 above the two shafts 23 and 26 and encircling eccentrics 32 mounted on the shafts, are straps 33. Although these eccentrics 32 can be variously formed, each eccentric as illustrated includes a drum-like body member 32a closed at one end, the said end being eccentrically bored to receive its shaft and the periphery of the drum being rabbeted or grooved to receive a plurality of roller bearings 32b fitting at their ends within recesses in side rings 32c. The open end of the drum-like member is closed by a plate 32d bolted thereto and forming the opposite rib of the rabbet or groove within which the roller bearings 32b and rings 32c are received. Each plate 32d is, of course, apertured to receive the shaft running through the eccentric. The various straps 33 fit within the grooves of the eccentrics and as best shown in Fig. 3, the various eccentrics on the shaft 23 are keyed to the shaft in different positions. Thus if the high point of the extreme left hand eccentric, as shown in Fig. 3, be considered to be located at zero degrees on the shaft, the high point of the eccentric first to the right will be located 90° in advance of the same and the high point of each succeeding eccentric to the right will be set 90° in advance of its left hand neighbor. Where more deck 28 and 29 than four are used, or where three decks are used, preferably the high points of the various eccentrics will be located one in advance of the other successively a number of degrees equal to the result obtained by dividing 360° by the number of decks used. The eccentrics mounted on the shaft 26 are located in the same relation as the eccentrics on shaft 23, so that the positions of alined eccentrics over which both straps 33 connected to a single deck 28 or 29 work are identically the same.

Secured to the two shafts 24 and 25 and fitting adjacent decks 28 and 29 are polygonal-shaped cutting disks 34 which are sharpened at their edges. These disks may be hexagonal in shape as illustrated or they may be of any other regular or irregular polygonal-shape. The disks 34 are eccentrically mounted on the shafts 24 and 25 in different relations so that the high points of the various disks will be differently disposed when the various shafts are in any fixed position. These disks project above the decks 28 and 29 some little distance.

Mounted on the upper edges of the side boards 19 in somewhat rearwardly spaced relation from the rear or mouth edge of the mouth plate 17, are a pair of bearing brackets 35 within which a transverse shaft 36 is journaled, the said shaft carrying a pair of similarly disposed eccentrics 37 adjacent its two ends. Straps 38 work over the eccentrics 37 and are secured to a transverse plate 39 serrated or teethed at its lower edge, and hereinafter referred to as a retarding plate. Links 40 are pivotally connected to the retarding plate 39 adjacent its upper corners and these links are secured to a transverse oscillating shaft 41 journaled in bearing brackets 42 secured to the upper edges of the side boards 19 in rearwardly spaced relation from the brackets 35.

Although various driving mechanism can be employed for driving the various parts, in the construction shown the shaft 23 is illustrated as projecting beyond the left side of the machine as shown in Fig. 3 and as being equipped with a pulley 43 to which a suitable belt (not illustrated) operated from any suitable source of power, may run. A sprocket 44 is also secured to the projecting portion of shaft 23 and a sprocket chain 45 runs over sprocket 44 and a sprocket 46 secured to a projecting portion of shaft 24. Another sprocket 47 is secured to the projecting portion of shaft 24 and a sprocket chain 48 runs over sprocket 47 and a fourth sprocket 49 secured to a projecting portion of shaft 25. Pulleys 50 and 51 respectively are mounted on the projecting portion of shaft 23 and on a projecting portion of shaft 36 and an endless belt 52 runs over these two pulleys. In operation the shaft 23 will be driven in a clockwise direction, as indicated by the arrow Fig. 1, and it will be seen that all the various shafts 23, 24, 25 and 36 will be driven in a similar direction. Through the use of sprockets of proper size, the two shafts 24 and 25 will be rotated more rapidly than the shaft 23 and shaft 36.

When the machine is placed in operation, the cutting disks 34 will, of course, rotate in a clockwise direction as viewed in Fig. 1. The eccentrics 32 on the shaft 23 will impart a gyratory movement to the various decks 28 and 29. Due to the fact that four eccentrics are mounted on the shaft 23 as specified, and four eccentrics are similarly mounted on the shaft 26 as specified, the shaft 26 will move with the shaft 23 and the gyration of the forward end of each deck 28 and 29 will be similar to the gyration of the rear end of each deck. In other words, although each deck will maintain its given angularity to the ground at all times, it will gyrate as an entirety and all portions of the deck will be moved upwardly, forwardly, downwardly and rearwardly in the same manner. Gyration of the decks will, of course, take place in a vertical plane. A construction very similar to the construction illustrated, may be operatively used when any number of decks, more than two, are provided. Other mechanism than of the type shown would be necessary to be used in gyrating the decks of a feeder wherein two decks only were used, but it is within the scope of the present invention to provide such mechanism. The retarding plate 39 will be moved by reason of the eccentrics 37 and the links 40 so that the lower serrated edge of the plate will be first moved upwardly, then forwardly and downwardly, then rearwardly and then again upwardly.

In feeding bundles of corn to the snapping rollers 9, the bundles with the twine encircling the same uncut will be pitched onto the rear portions of the decks 28 and 29 in such direction that the stalks of corn will extend preferably butts forward on the decks. The different decks will all stand at different levels, one relative to the other and due to the gyratory movement of the various decks and to the provision of the teeth 31, the corn will be advanced forwardly from the rear ends of the decks toward the forward ends thereof. The bundle will be first drawn forwardly over the rear cutting disks 34 and then over the forward cutting disks 34. The various disks which travel more rapidly than the forward movement of the corn over the feeder will cut the twine binding the bundle with a shearing action due both to the eccentric positioning of the disks on the shafts 24 and 25 and due also to the polygonal-shape of the disks. After the twine has been cut about a bundle, the various decks 28 and 29, certain of which move forwardly at the same time that others move rearwardly, will spread the corn stalks longitudinally of the decks a considerably greater distance than the length of the original bundle. Also due to the gyratory action of the various decks, the various stalks of the bundle will spread laterally so that by the time the butt ends of the forward stalks of the bundle approach the forward ends of the decks the various stalks of the bundle will have spread out laterally over all the decks to cause the corn to lie in practically uniform depths over all portions of the various decks. Further longitudinal and transverse spreading action will be given to the stalks of the bundle by the retarding plate 39. This plate will act against the upper strata of corn stalks as the stalks are carried below the same and it will push back the upper strata of stalks relative to the lower strata and permit only a stream of stalks of a certain uniform depth to be carried forwardly beyond the plate. In other words, the plate 39 will prevent feed of corn in too great quantities to the snapping rollers 9. The inclined mouth plate 17 acts somewhat in the nature of a directing plate for directing the stalks to a point between the two oppositely moving snapping rollers 9. As the corn advances beyond the forward edges of the decks 28 and 29, the butt ends of the stalks will be carried against the snapping rollers 9. Portions of the corn beyond the forward ends of the decks will be supported partly by the bridging arms 30 and will be gyrated so that the forward ends of the stalks will be moved upwardly and downwardly to find their way between the two snapping rollers 9. In other words, by reason of the gyration of the stalks at their forward ends, the stalks will not jamb against the snapping rollers and choke the passage of other stalks thereto for the reason that the upward and downward movement of the stalks together with the forward movement of the stalks will cause the stalks to always find their way to the space between the two rollers. Also the bridging arms 30 while permitting the ears of corn torn from the stalks by means of the snapping rollers to drop downwardly onto the husking rollers 13, prevent any stalks which may work crosswise of the decks from dropping downwardly below the decks. The arms serve to carry the stalks almost directly to the snapping rollers, whereas in slat and chain conveyer feeders and in belt feeders, of necessity, the conveyers or belts must terminate a considerable distance behind the snapping rollers to permit the ears of corn to drop downwardly between the forward ends of the conveyers or belts and the rollers.

The feeder of the present invention has been amply and successfully demonstrated in actual practice. The parts are few and the construction is simple and inexpensive. It will, of course, be appreciated that the feeder can be applied as an attachment to a corn shredder or can be permanently built into the machine when the machine is originally made.

Although the feeder of the present invention is particularly adapted for use in connection with corn shredders, it is capable of use with many other types of machines and is of particular advantage for use with a machine having oppositely acting rollers or cylinders between which material is to be fed.

It will, of course, be understood that various changes may be made in the form, details, arrangement and proportions of the various parts without departing from the scope of the present invention, which, generally stated, consists in the matter shown and described and set forth in the appended claims.

Attention should be called to the fact that cutting disks 34 in addition to cutting the twine about bundles pitched onto the decks, also serve by reason of their rotation to assist in moving the stalks or other material fed forwardly over the decks. By increasing the number of disks used, it is possible to utilize the disks as the sole advancing agent for advancing material to the snapping rollers.

What is claimed is:—

1. In a machine such as a corn shredder having oppositely acting members between which material is to be fed, a feeder for feeding material to said members comprising a deck over which material may travel to said oppositely acting members, shafts mounted for rotation below said deck, means for rotating said shafts and a plurality of polygonal-shaped disks sharpened at their edges and eccentrically mounted on said shafts in differently timed relations and projecting upwardly above said deck, said disks while acting to cut the twine on bundles of material moving over said deck also acting to move the material forwardly over said deck.

2. The combination with the snapping rollers of a corn shredder, of a feeder for feeding material forwardly to said rollers to be acted on thereby, said feeder comprising a plurality of decks mounted for dissimilarly timed gyratory movement behind said rollers, means for gyrating all portions of each deck first upwardly then forwardly then downwardly and then rearwardly, upwardly and forwardly inclined teeth mounted on said decks for advancing the material running thereover and bridging arms rigidly secured to the forward ends of certain of said decks and extending to points adjacent said rollers for causing the material to be gyrated first upwardly then forwardly and then downwardly in contiguity with the rollers.

3. The combination with the snapping rollers of a corn shredder, of a feeder for feeding material to said rollers to be acted on thereby, said feeder including a pair of spaced shafts disposed rearwardly of said rollers and extending parallel thereto, a plurality of decks overlying said shafts and extending to points adjacent said rollers, means eccentrically connecting each deck to both of said shafts for gyration of all portions of each deck similarly upwardly, forwardly, downwardly and rearwardly, said means eccentrically connecting the different decks to the shafts being arranged to impart differently timed gyrating movement to at least certain of the different decks, upwardly and forwardly inclined teeth mounted on said decks and means for driving one of said shafts to cause each deck to move upwardly, forwardly, downwardly and rearwardly in the order named.

4. The combination with the snapping rollers of a corn shredder, of a feeder for feeding material forwardly to said rollers to be acted on thereby, said feeder comprising a pair of spaced shafts extending transversely of the corn shredder rearwardly of said snapping rollers, a plurality of longitudinal decks overlying said shafts and extending to points adjacent said rollers, a plurality of eccentrics mounted on each shaft, straps secured to the undersides of said decks and actuated by said eccentrics, pairs of eccentrics on the two shafts being in longitudinal alinement and the two eccentrics of each pair being similarly positioned on the two shafts, the eccentrics on each shaft being differently positioned, means for rotating one of said shafts so that the shaft moves first downwardly and rearwardly at its lower forward portion, teeth carried by the upper surfaces of said decks for advancing the material running thereover and bridging arms secured to the forward ends of certain of said decks and running forwardly to points contiguous to said rollers whereby the material will be advanced over the decks through gyratory movement imparted thereto and the material will be moved first upwardly then forwardly and then downwardly in contiguity with said snapping rollers.

5. In a machine such as a corn shredder having oppositely acting members between which material is to be fed, a feeder for feeding material to said members comprising a plurality of decks mounted for dissimilarly timed gyratory movement behind said oppositely acting members and terminating adjacent but short of said oppositely acting members, upwardly and forwardly projecting teeth carried by said decks, means for imparting gyratory movement to said decks and rotary polygonal-shaped cutters projecting upwardly above said decks at all times for cutting the twine binding bundles of material passing over said decks, said decks constantly raising and lowering relative to said cutters and means rotating said cutters in the same direction as the direction of gyration of said decks but at higher speed than the speed of gyration of said decks.

6. The structure defined in claim 13, said cutters being disks sharpened at their edges and eccentrically mounted for rotation.

7. The combination with the snapping rollers of a corn shredder, of a feeder for feeding material to said rollers to be acted on thereby, said feeder including means rearwardly of said rollers for advancing the material thereto, a shaft mounted above said means, eccentrics carried by said shaft, a transverse retarding plate working against the upper run of material, straps carried by said plate and working over said eccentrics, links pivotally connected to said plate at their forward ends and pivotally anchored at their rear ends and means for rotating said shaft to move the lower edge of said plate in order forwardly, downwardly, rearwardly and upwardly consecutively.

8. The combination with the snapping rollers of a corn shredder, of a feeder for feeding material to said rollers to be acted on thereby, said feeder including means rearwardly of said rollers for advancing material thereto, a shaft mounted above said means, a transverse retarding plate working against the upper run of the material, means eccentrically connecting said plate to said shaft for gyration of said plate, links pivotally connected to said plate at their forward ends and pivotally anchored at their rear ends and means for rotating said shaft to move the lower edge of said plate in order forwardly, downwardly, rearwardly and upwardly consecutively.

9. The combination with the snapping rollers of a corn shredder, of a feeder for feeding material forwardly to said rollers to be acted on thereby, said feeder comprising a plurality of decks mounted for dissimilarly timed gyratory movement behind said rollers, means for gyrating all portions of each deck, first upwardly, then forwardly, then downwardly and then rearwardly and bridging arms extending forwardly from certain of said decks to points adjacent said rollers for causing the material to be gyrated first upwardly, then forwardly and then downwardly in contiguity with the rollers.

10. The combination with the snapping rollers of a corn shredder, of a feeder for feeding material forwardly to said rollers to be acted on thereby, said feeder comprising a plurality of decks mounted for dissimilarly timed gyratory movement behind said rollers, means for gyrating all portions of each deck, first upwardly, then forwardly, then downwardly and then rearwardly, elements on said decks for advancing the material running thereover and bridging arms extending forwardly from the forward ends of certain of said decks to points adjacent said rollers and gyrating with said decks, said bridging arms causing the material to be gyrated first upwardly, then forwardly and then downwardly in contiguity with the rollers.

11. The combination with the snapping rollers of a corn shredder, of a feeder for feeding material to said rollers to be acted on thereby, said feeder including a pair of spaced shafts disposed rearwardly of said rollers and extending transversely of the shredder, a plurality of decks overlying said shafts and extending to points adjacent said rollers, means eccentrically connecting each deck to both of said shafts for gyration of all portions of each deck similarly upwardly, forwardly, downwardly and rearwardly, said means eccentrically connecting the different decks to the shafts being arranged to impart differently timed gyrating movement to at least certain of the different decks and means for driving one of said shafts to cause each deck to move upwardly, forwardly, downwardly and rearwardly in the order named.

12. The combination with the snapping rollers of a corn shredder, of a feeder for feeding material to said rollers to be acted on thereby, said feeder including a pair of spaced shafts disposed rearwardly of said rollers and extending transversely of the shredder, a plurality of decks overlying said shafts and extending to points adjacent said rollers, means eccentrically connecting each deck to both of said shafts for gyration of all portions of each deck similarly upwardly, forwardly, downwardly and rearwardly, said means eccentrically connecting the different decks to the shafts being arranged to impart differently timed gyrating movement to at least certain of the different decks, elements on said decks for advancing material running thereover and means for driving one of said shafts to cause each deck to move upwardly, forwardly, downwardly and rearwardly in the order named.

13. In a machine such as a corn shredder having oppositely acting members between which material is to be fed, a feeder for feeding material to said members comprising a plurality of decks mounted for dissimilarly timed gyratory movement behind said oppositely acting members and terminating adjacent but short of said oppositely acting members, means for imparting gyratory movement to said decks and rotary polygonal shaped cutters projecting upwardly above said decks at all times for cutting the twine binding bundles of material passing over said decks, said decks constantly raising and lowering relative to said cutters and means rotating said cutters in the same direction as the direction of gyration of said decks, said cutters acting to assist in advancing the material over said decks.

14. In a machine such as a corn shredder having oppositely acting rollers between which material is to be fed, a feeder for feeding material forwardly to said rollers, comprising means advancing the material towards said rollers, said means including elements in contiguity with the rollers gyrating the material in order upwardly, forwardly and downwardly consecutively.

15. In a machine such as a corn shredder having oppositely acting rollers between which material is to be fed, a feeder for feeding material forwardly to said rollers, comprising means advancing the material towards said rollers, said means including elements in contiguity with the rollers gyrating the material in order upwardly, forwardly and downwardly consecutively and means retarding the advancing movement of the upper strata of material relative to the lower strata.

16. In a machine such as a corn shredder having oppositely acting rollers between which material is to be fed, feeding means operating beneath the material for feeding material forwardly to said rollers and a retarder acting on the upper strata of material to retard the upper movement of the strata relative to the lower strata, said retarder comprising a member extending transversely of said feeding means above the same and means driving said member so that the lower edge of the same describes substantially the path of an ellipse the major axis of which inclines diagonally upwardly and rearwardly relative to said rollers, said member moving generally rearwardly when in its lowest portion.

17. In a machine such as a corn shredder having oppositely acting members between which material is to be fed, a feeder for feeding material to said members, comprising a plurality of decks mounted for dissimilarly timed gyratory movement behind said oppositely acting members and terminating adjacent but short of said oppositely acting members, means for imparting gyratory movement to said decks and a rotary cutter projecting upwardly above said decks at all times for cutting the twine binding bundles of material passing over said decks, said cutter having diverse portions of its edges radially spaced varying distances from the center of the cutter, said decks constantly raising and lowering relative to said cutter and means rotating said cutter in the same direction as the direction of gyration of said decks, said cutter acting to assist in advancing the material over said decks.

WALTER W. P. STELTER.